United States Patent
Behravan et al.

(10) Patent No.: US 9,398,483 B2
(45) Date of Patent: Jul. 19, 2016

(54) METHOD AND CONTROLLING NODE FOR CONTROLLING MEASUREMENTS BY A USER EQUIPMENT

(71) Applicant: Telefonaktiebolaget L M Ericsson (publ), Stockholm (SE)

(72) Inventors: Ali Behravan, Stockholm (SE); Muhammad Kazmi, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 14/408,747

(22) PCT Filed: Jun. 19, 2013

(86) PCT No.: PCT/SE2013/050729
§ 371 (c)(1),
(2) Date: Dec. 17, 2014

(87) PCT Pub. No.: WO2013/191636
PCT Pub. Date: Dec. 27, 2013

(65) Prior Publication Data
US 2015/0208263 A1    Jul. 23, 2015

Related U.S. Application Data

(60) Provisional application No. 61/661,421, filed on Jun. 19, 2012.

(51) Int. Cl.
*H04B 7/00* (2006.01)
*H04W 24/10* (2009.01)
(Continued)

(52) U.S. Cl.
CPC .............. *H04W 24/10* (2013.01); *H04B 7/024* (2013.01); *H04B 7/0626* (2013.01);
(Continued)

(58) Field of Classification Search
CPC .............................. H04W 24/02; H04W 24/10
USPC .................. 370/310, 328, 329, 431, 433, 437
See application file for complete search history.

(56) References Cited

U.S. PATENT DOCUMENTS 8,767,581 B2 * 7/2014 Yamada ................ H04W 24/00
                                                           370/252
9,094,855 B2 * 7/2015 Etemad ................. H04W 24/10
(Continued)

OTHER PUBLICATIONS

3GPP, "3rd Generation Partnership Project; Technical Specification Group Radio Access Network; Coordinated multi-point operation for LTE physical layer aspects (Release 11)", 3GPP TR 36.819 V11.1.0, Dec. 2011, 1-69.
(Continued)

*Primary Examiner* — Dmitry H Levitan
(74) *Attorney, Agent, or Firm* — Patent Portfolio Builders, PLLC

(57) ABSTRACT

A method and controlling node (400) of a cellular network, to control measurements on signals to or from a User Equipment, UE, engaged in a radio communication in a cluster cell served by multiple transmission points (404). A set of conditions potentially affecting performance for the UE in the cluster cell, is identified. At least one type of reference signals and corresponding radio measurement(s) are then selected based on the identified set of conditions. The controlling node obtains measurements made on the selected type(s) of reference signals according to the radio measurement(s), and configures a UE-specific measurement set of transmission points (406) for the UE, out of the transmission points (404) serving the cluster cell, based on the obtained measurements. The UE is then instructed to perform and report measurements on UE-specific downlink signals transmitted from the transmission points of the UE-specific measurement set.

24 Claims, 4 Drawing Sheets

(51) Int. Cl.
*H04B 7/02* (2006.01)
*H04B 7/06* (2006.01)
*H04L 5/00* (2006.01)
*H04W 72/12* (2009.01)

(52) U.S. Cl.
CPC ............. *H04B 7/0632* (2013.01); *H04L 5/006* (2013.01); *H04L 5/0051* (2013.01); *H04L 5/0057* (2013.01); *H04L 5/0085* (2013.01); *H04L 5/001* (2013.01); *H04L 5/0023* (2013.01); *H04L 5/0035* (2013.01); *H04W 72/1231* (2013.01)

(56) References Cited

U.S. PATENT DOCUMENTS

| | | | | |
|---|---|---|---|---|
| 9,143,951 B2* | 9/2015 | Gomadam | ............ | H04W 24/00 |
| 9,172,439 B2* | 10/2015 | Hammarwall | ......... | H04B 7/024 |
| 2013/0003788 A1* | 1/2013 | Marinier | ................ | H04B 7/024 |
| | | | | 375/219 |
| 2013/0044707 A1* | 2/2013 | Chen | ................ | H04W 72/1231 |
| | | | | 370/329 |
| 2013/0148515 A1* | 6/2013 | Ribeiro | ................ | H04L 5/0094 |
| | | | | 370/252 |
| 2015/0036612 A1* | 2/2015 | Kim | ...................... | H04B 17/00 |
| | | | | 370/329 |

OTHER PUBLICATIONS

Unknown, Author, "Aspects on Distributed RRUs with Shared Cell-ID for Heterogeneous Deployments", 3GPP TSG-RAN WG1 #64, R1-110649, Ericsson, ST-Ericsson, Taipei, Taiwan, Feb. 21-25, 2011, 1-11.

Unknown, Author, "CoMP resource management and CoMP measurement set", 3GPP TSG-RAN WG2 Meeting #78, R2-122172, Panasonic, Prague, Czech Republic, May 21-25, 2012, 1-2.

Unknown, Author, "Considerations on CSI-RS based ARM measurement", 3GPP TSG RAN WG2 Meeting #78, R2-122265, New Postcom, Prague, Czech Republic, May 21-25, 2012, 1-4.

Unknown, Author, "CSI-RS Based RRM Measurement for DL CoMP", 3GPP TSG-RAN WG2 #78, R2-122832, Intel Corporation, Prague, Czech Republic, May 21-25, 2012, 1-6.

Unknown, Author, "Discussion on RRM/CoMP Measurement Set Management", 3GPP TSG•RAN WG1 #68, R1.120244, Hitachi Ltd., Dresden, Germany, Feb. 6-10, 2012, 1-4.

Unknown, Author, "Use of CSI-RS for CoMP Measurement Set Management", 3GPP TSG-RAN WG1 #68, R1-120786, Ericsson, ST-Ericsson, Dresden, Germany, Feb. 6-10, 2012, 1-3.

* cited by examiner

METHOD AND CONTROLLING NODE FOR CONTROLLING MEASUREMENTS BY A USER EQUIPMENT

TECHNICAL FIELD

The present disclosure relates generally to a method and a controlling node for controlling signal measurements made by a User Equipment, UE, when measuring signals from multiple transmission points of a cluster cell.

BACKGROUND

In recent years, different types of cellular networks for wireless communication have been developed to provide radio access for various wireless devices in different areas. The cellular networks are constantly improved to provide better coverage and capacity to meet the demands from subscribers using services and increasingly advanced terminals, e.g. smartphones and tablets, which may require considerable amounts of bandwidth and resources for data transport over a radio interface in the networks. As a result, it is common to configure a cellular network with cells of varying types and sizes, e.g. in an overlapping fashion, to provide needed capacity and flexibility depending on expected traffic intensity in different areas, the cells thus forming a so-called heterogeneous cellular network.

In this disclosure, the term "User Equipment, UE" will be used to represent any user-controlled wireless communication device or terminal capable of radio communication including transmitting uplink signals and receiving downlink signals transmitted from a radio node over a transmission point. Thus, the term UE could for example be exchanged for wireless communication device throughout this disclosure. Further, the term "transmission point" is commonly used in this field and represents any antenna equipment, typically including antenna element, tower and radio head, from which downlink radio signals can be transmitted to UEs and also used for reception of uplink signals from the UEs. Throughout this description, a transmission point could thus also be referred to as a "transmission and reception point" but the term transmission point will be used for short. The radio nodes described here may include so-called high power nodes, commonly also referred to as macro nodes, and low power nodes, each node controlling one or more transmission points to serve different connected UEs.

A heterogeneous cellular network may comprise hierarchically arranged nodes, including macro nodes transmitting with relatively high power and covering relatively large areas of a size in the order of kilometers, and low power nodes transmitting with relatively low power and covering areas of a size in the order of a few meters, e.g. micro, pico, femto and relay nodes, to mention some customary examples. The low power nodes may be employed together with the macro nodes in an overlapping fashion to locally provide added capacity in so-called "hot spot" areas such that multiple small areas served by such micro/pico/femto/relay nodes may be located within the larger area served by a macro node.

A heterogeneous network may be realized basically in two different ways, according to currently existing solutions. In a first alternative, a macro node and multiple low power nodes cover individual cells with different cell identities, where multiple small cells are overlapped by a large macro cell served by the macro node. In such a network with separate cells being served by respective transmission points, a UE is served by a single transmission point at a time and must undergo handover between the cells when necessary to maintain a radio connection.

In a second alternative, the macro node and the low power nodes cover a single common or "combined" cell and all nodes therein use a single shared cell identity, which means that a UE in the cell can basically be served by several transmission points at the same time. The cell served by more than one transmission points of such a cell, is usually called a "cluster cell" or "Coordinated Multiple Point, CoMP, cluster" or CoMP cell. A CoMP cluster with shared cell identity may even be called a shared cell or cell with shared or common cell identity. The term cluster cell will be used throughout this disclosure. CoMP may also be used in a scenario where a macro node and multiple low power nodes within the coverage of the macro node use individual cell identities.

In one example, the transmission points using a common cell identity may also be regarded as a distributed radio node or base station with multiple antennas at different locations in the cell. In another example, a plurality of transmission points comprising at least one high power node and multiple low power nodes may be combined to serve a cell. The transmission points in a cluster cell may use the same cell ID, or cluster cell ID, or the transmission points may use different individual cell IDs. In this type of network, one or more transmission points may be controlled by a radio node serving the cluster cell. For example, each transmission point may be controlled by its own radio node located at the transmission point, or several transmission points may be controlled by a common radio node, and so forth.

The latter alternative of using a cluster cell with multiple transmission points and corresponding radio nodes has the advantage of eliminating the need for performing handover when moving from one transmission point to another which reduces the amount of signaling and also reduces the risk of dropped connection due to failed handover, among other things. Uplink radio signals, e.g. containing data, sent from the UE are received by multiple transmission points and corresponding radio nodes which may be able to decode and process the signals jointly. On the other hand, any downlink radio signals directed to the UE may be sent from multiple transmission points of the cluster cell which may enhance reception and decoding of the signals.

In FIG. 1, a cluster cell is served by a macro transmission point 100 covering basically the whole area of the cluster cell, and a plurality of low power transmission points 102, 104, 106, 108 and 110 each covering a limited part of the whole cluster cell area. A UE located somewhere in the cluster cell may be connected to all or some of the transmission points 100-110 at the same time such that these transmission points receive uplink radio signals sent from the UE. Further, the UE may receive and decode radio signals transmitted from at least some of the transmission points 100-110.

The UE may also perform measurements on the received radio signals and report these measurements to the network, e.g. over one or more of the transmission points, which network is then able to use the reported measurements for various purposes, e.g. for scheduling of radio resources, link adaptation, selection of antenna transmission mode, and so forth. The measured radio signals may comprise Channel State Information Reference Signals, CSI-RS, which are regularly transmitted from the transmission points. Such measurements by the UE are also often used for coordinating radio communication between neighboring cluster cells, such that the measurement results from a first cluster cell are communicated to and used by a neighboring second cluster cell to schedule transmissions therein in a way that reduces interference in the first cluster cell and/or in the second cluster cell. This is generally referred to as Inter-Cell Interference Coordination, ICIC. For example, an aggressor cluster cell may decide or agree to mute its transmissions during time intervals when interference-sensitive reference signals are transmitted in a neighboring victim cluster cell.

In order to make the above-described radio measurements efficient and useful, a UE-specific measurement set including a subset of all the transmission points of a cluster cell may be configured for a specific UE, wherein the UE is instructed to measure reference signals, such as CSI-RS, being transmitted from the transmission points of the UE-specific measurement set. Thereby, the transmission points providing the "best" signal strength and/or quality for the UE may hopefully be selected for inclusion in the UE-specific measurement set. In networks and systems based on Long Term Evolution, LTE, this is sometimes called the "COMP measurement set". Typically, the transmission points being close to the UE and/or providing higher received power at the UE, in this example transmission points 102, 104 and 106, should be included in the UE-specific measurement set, as illustrated by the arrows therefrom in FIG. 1. The figure shows two example transmission points 108 and 110 which are not included in the UE-specific measurement set.

However, the selection of transmission points in the UE-specific measurement set is sometimes less than optimal such that some transmission points included in the measurement set do not provide satisfactory measurement results, e.g. due to insufficient or inaccurate signal strength and/or quality, while other transmission points not included in the measurement set might have provided better results and thus more useful measurements by the UE. It is thus a problem that one or more transmission points in the UE-specific measurement set sometimes cannot provide for, or enable, efficient and useful measurements of transmitted radio signals, and that these measurements may be a poor or even misleading basis for inter-cell coordination or more specifically inter-cluster cell coordination. This problem may reduce capacity and efficiency in resource usage in the cluster cell and its neighboring cluster cells. Another problem is that the employment of a cluster cell with shared cell identity may be suitable and beneficial in some situations but not in others.

SUMMARY

It is an object of embodiments described herein to address at least some of the problems and issues outlined above. It is possible to achieve this object and others by using a method and a controlling node as defined in the attached independent claims.

According to one aspect, a method is performed by a controlling node of a cellular network for wireless communication, to control measurements on signals to or from a User Equipment, UE, engaged in a radio communication in a cluster cell of the cellular network, wherein the cluster cell is served by multiple transmission points. In this method, the controlling node identifies a set of conditions potentially affecting performance of the radio communication in the cluster cell, and selects at least one type of reference signals and corresponding at least one radio measurement based on the identified set of conditions.

The controlling node then obtains measurements made on the selected at least one type of reference signals according to the at least one radio measurement, and configures a UE-specific measurement set of transmission points for the UE, out of the multiple transmission points serving the cluster cell, based on the obtained measurements. Finally, the controlling node instructs the UE to perform and report measurements on UE-specific downlink signals transmitted from the transmission points of the UE-specific measurement set.

According to another aspect, a controlling node is configured to control measurements on signals to or from a UE engaged in a radio communication in a cluster cell of the cellular network, wherein the cluster cell is served by multiple transmission points. The controlling node comprises an identifying unit configured to identify a set of conditions potentially affecting performance of the radio communication in the cluster cell, and a selecting unit configured to select at least one type of reference signals and corresponding at least one radio measurement based on the identified set of conditions.

The controlling node also comprises an obtaining unit configured to obtain measurements made on the selected at least one type of reference signals according to the at least one radio measurement, and a configuring unit configured to configure a UE-specific measurement set of transmission points for the UE, out of the multiple transmission points serving the cluster cell, based on the obtained measurements. The controlling node further comprises an instructing unit configured to instruct the UE to perform and report measurements on UE-specific downlink signals transmitted from the transmission points of the UE-specific measurement set.

When using the above method and controlling node, efficient and useful measurements of the downlink signals may be achieved and this may in turn improve capacity and efficiency in resource usage in the cluster cell and possibly also in one or more neighboring cluster cells of the cellular network.

The above method and controlling node may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

The following disclosure refers to radio communication between a UE and a cellular network for wireless communication, the cellular network comprising a cluster cell. In this solution, it is recognized that measurements made on downlink and/or uplink reference signals may be improved by configuring a UE-specific measurement set of transmission points in the cluster cell for a particular UE with consideration of a set of conditions, in other words currently prevailing circumstances, potentially affecting performance of the radio communication in the cluster cell. Thereby, more efficient and useful measurements of the downlink and/or uplink reference radio signals may be achieved by instructing the UE to perform and report measurements on signals from the UE-specific measurement set of transmission points, and possibly also by measuring at the transmission points of the UE-specific measurement set uplink signals transmitted from the UE. These downlink and/or uplink measurements may then be used effectively as a relevant basis for inter-cell coordination or inter-cluster cell coordination, among other things. The measurements may further be used by the serving node for scheduling, link adaptation, selection of antenna transmission mode, etc. This may in turn improve capacity and efficiency in resource usage in the cluster cell and possibly also in one or more neighboring cluster cells of the cellular network.

Figure 1:
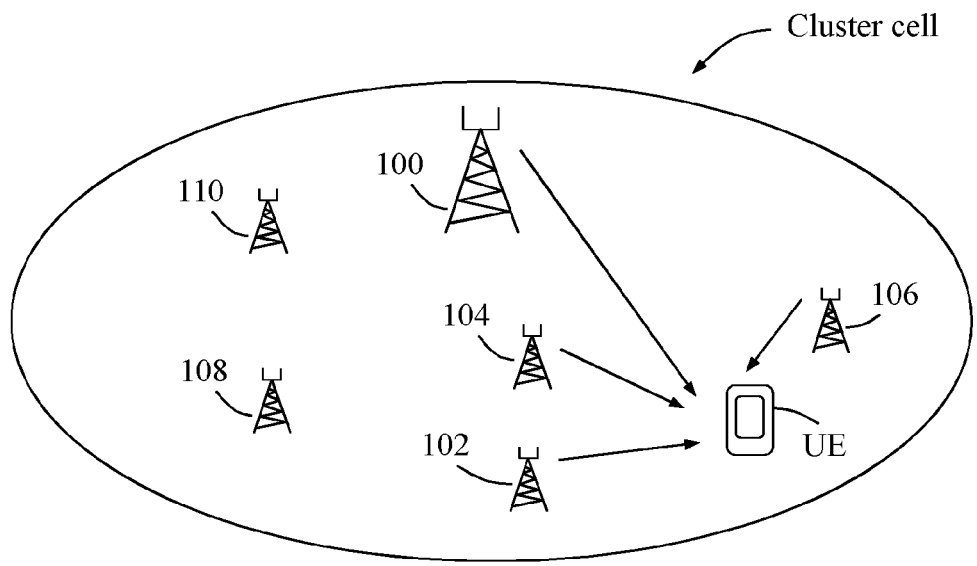
FIG. 1 is a communication scenario illustrating a cluster cell, according to the prior art.
Figure 2:
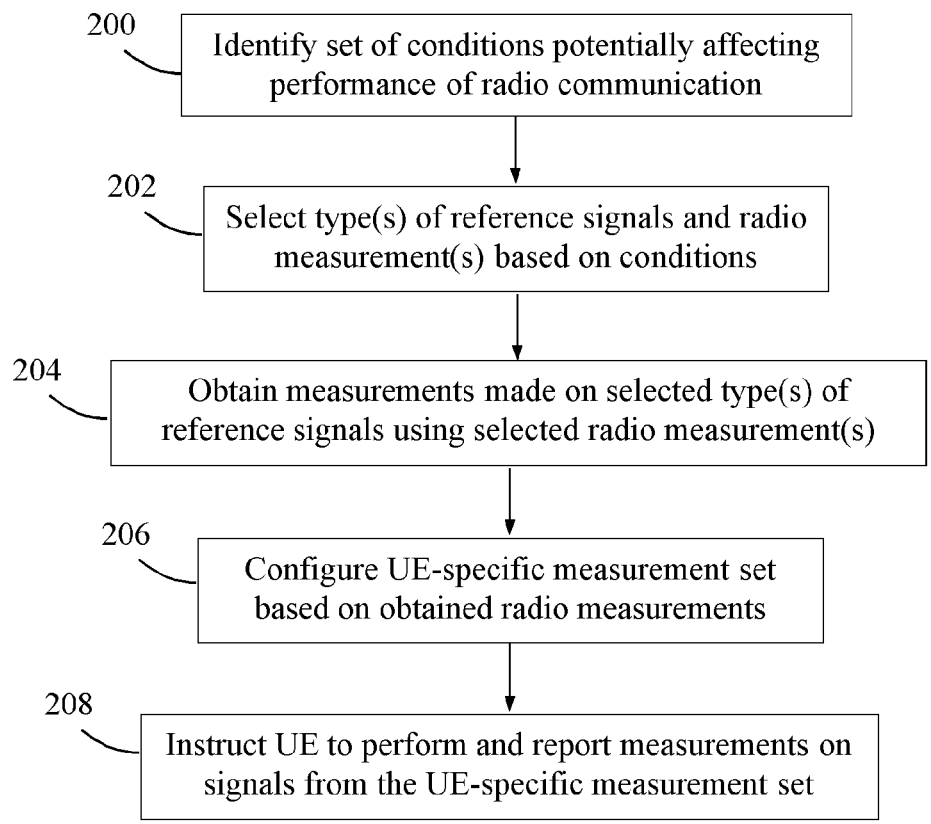
FIG. 2 is a flow chart illustrating a procedure in a controlling node, according to some possible embodiments.

The solution outlined above and in the following examples may be implemented by functionality in a controlling node of the cellular network. The term "controlling node" will be consistently used throughout this disclosure although other similar and fitting terms could be used as well. In practice, the controlling node may be implemented in a macro node of the cluster cell or in a centralized node serving multiple cluster cells in the cellular network, although the controlling node is not limited to these examples. An example of how the controlling node may operate when employing the solution will now be described with reference to the flow chart in FIG. 2, illustrating actions performed by the controlling node to control measurements by a UE engaged in a radio communication in a cluster cell of the cellular network. It is assumed that the cluster cell is served by multiple transmission points, basically in the manner described above.

In a first shown action 200, the controlling node identifies the above-mentioned set of conditions, or circumstances, potentially affecting performance of the radio communication in the cluster cell. The set of conditions may comprise various parameters, configurations and characteristics which thus may influence the performance of the radio communication, e.g. in terms of propagation environment, interference situation, synchronization in the network, etc., which in turn impact data rate, latency and connectivity. The conditions identified by the controlling node in this action may include static conditions which change rarely if at all. The static conditions can thus be assumed to be more or less stable and may relate to various settings made by an operator of the cellular network. In reality, the static conditions may be "semi-static" if changed occasionally. The conditions may also include dynamic, or "real-time", conditions which may change quite rapidly and basically in an unpredictable manner, chiefly depending on ongoing traffic and transmissions in the network including rapid variations of the traffic characteristics.

Some illustrative but non-limiting examples of static conditions that may be included in the identified set of conditions are listed below.

Static Conditions 1) configuration of reference signals at the transmission points serving the cluster cell,
2) time synchronization between transmissions from the transmission points serving the cluster cell,
3) frequency synchronization between transmissions from the transmission points serving the cluster cell,
4) characteristics of communication interfaces between the transmission points serving the cluster cell,
5) characteristics of deployment or network topology of the cluster cell,
6) radio propagation environment, and
7) muting scheme of downlink transmissions from the transmission points serving the cluster cell.

Some illustrative but non-limiting examples of dynamic conditions that may be included in the identified set of conditions are listed below.

Dynamic Conditions 1) interference experienced at the UE and/or at the transmission points serving the cluster cell,
2) current traffic load in the cluster cell,
3) amount of pending data in buffers of the transmission points serving the cluster cell,
4) current utilization of uplink and downlink channels for transmissions,
5) currently used bandwidth for uplink and downlink transmissions, and
6) current quality of signals received at the UE and/or at the transmission points serving the cluster cell.

A more detailed description of the above examples of conditions and how they may be obtained will follow later below.

In a further action 202, the controlling node selects at least one type of reference signals and corresponding at least one radio measurement based on the identified set of conditions. Thereby, the most suitable type(s) of reference signals and corresponding radio measurement(s) may be selected depending on the prevailing conditions, to provide a reliable, valid and efficient basis for configuring the UE-specific measurement set of transmission points. For example, the at least one type of reference signals and the corresponding at least one radio measurement may be selected from a preconfigured mapping table which maps different possible conditions to different possible types of uplink and downlink reference signals and corresponding radio measurements. Some illustrative but non-limiting examples of how such a mapping table may be configured will follow later below. In another example, the selected at least one type of reference signals comprise at least one of: uplink reference signals sent from the UE and downlink reference signals sent from the transmission points serving the cluster cell.

In another action 204, the controlling node obtains measurements made on the selected at least one type of reference signals according to the at least one radio measurement. As indicated above, these measurements may include downlink measurements or uplink measurements or both downlink and uplink measurements.

The next action 206 illustrates that the controlling node configures the UE-specific measurement set of transmission points for the UE, out of the multiple transmission points serving the cluster cell, based on the measurements obtained in the preceding action 204. An example of how this action may be performed is as follows. The controlling node may select, from the multiple transmission points serving the cluster cell, those transmission points that provide the best measurement results in terms of signal strength and/or signal quality according to the obtained radio measurements on uplink and/or downlink radio signals, for inclusion in the UE-specific measurement set. In this way, the most favourable transmission points will be included in the UE-specific measurement set under the prevailing conditions, situation or circumstances.

In a final shown action 208, the controlling node instructs the UE to perform and report measurements on UE-specific downlink signals transmitted from the transmission points of the UE-specific measurement set. In some possible embodiments, the UE-specific downlink signals may comprise Channel State Information Reference Signals, CSI-RS, and the UE may in that case be instructed to perform and report measurements of at least one of: Reference Signal Received Power, RSRP, of the CSI-RS and Reference Signal Received Quality, RSRQ, of the CSI-RS.

The above-described actions may be performed by the controlling node in conjunction with further possible embodiments. For example, the UE may further be instructed to transmit uplink signals to be measured by the transmission points of the UE-specific measurement set based on the identified set of conditions. In that case, another possible example is that the transmission points of the UE-specific measurement set may be instructed by the controlling node to perform and report measurements on the above-mentioned uplink signals transmitted by the UE.

Further possible embodiments include that the set of conditions may be updated, by the controlling node, based on performance-related information relating to at least one of: performance of said at least one radio measurement, performance of the UE in the cluster cell, and system performance in the cluster cell. The above term performance may refer to signal strength at the UE, signal quality at the UE, delivered data rate to the UE, and may further refer to delivered data rate in the whole cluster.

In yet another possible embodiment, the identified set of conditions may be used as a basis for deciding to employ a single shared cell identity for the cluster cell when at least one of the identified conditions satisfies a threshold qualification that has been predefined as a prerequisite for using shared cell identity for the cluster cell instead of using individual identities for different transmission points in the cluster cell. Another possible embodiment is that the controlling node may request at least one radio node controlling one or more of the transmission points serving the cluster cell, to reduce transmission power at the one or more transmission points in order to reduce interference in the cluster cell.

Figure 3:
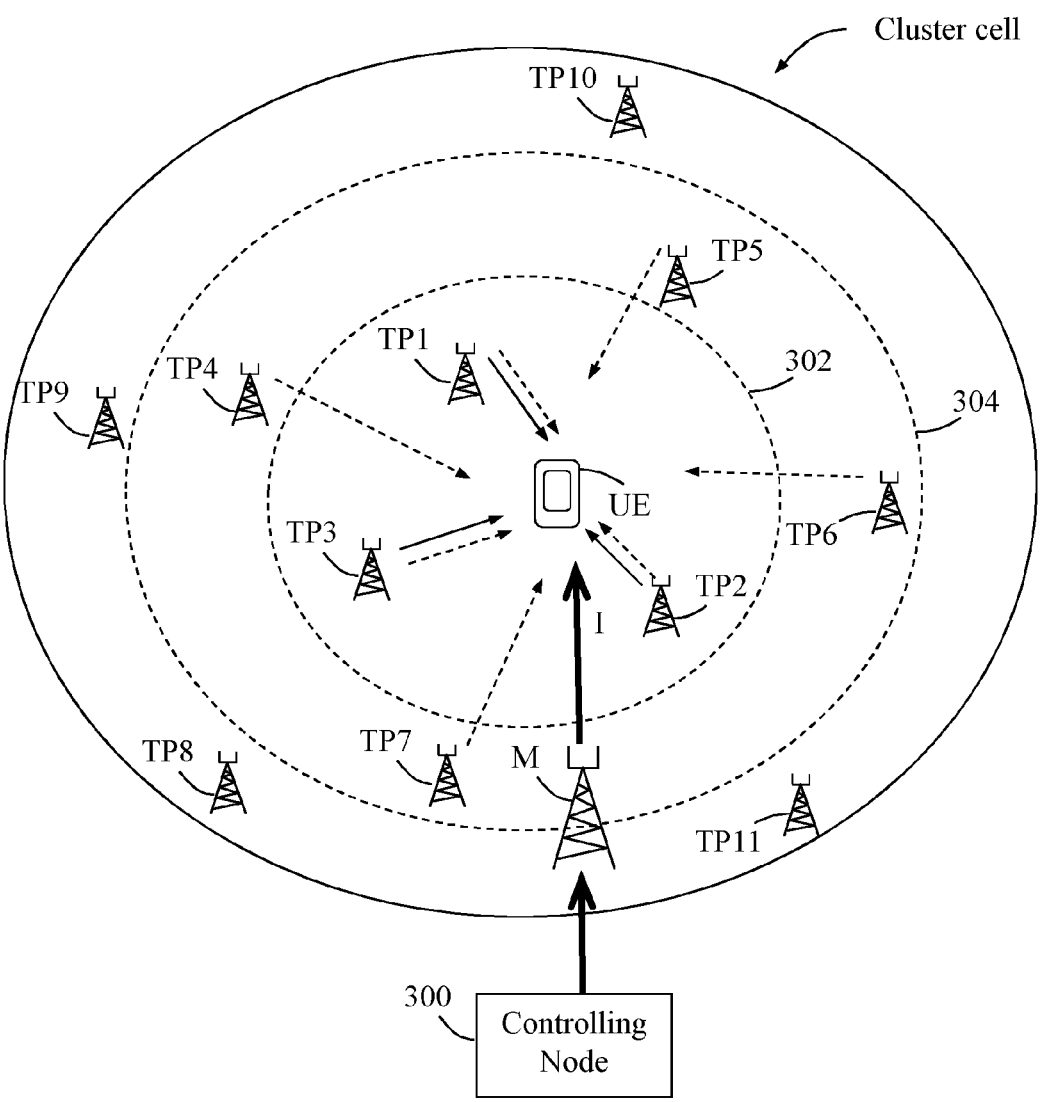
FIG. 3 is a communication scenario illustrating a cluster cell when a controlling node is used, according to further possible embodiments.

FIG. 3 illustrates an example of a communication scenario where the above-described solution and embodiments may be employed for a UE engaged in a radio communication in a cluster cell served by multiple transmission points including a macro node "M" and a plurality of low power nodes "TP1-TP11". It is assumed that the macro node M is able to act as a serving node and thus to send messages and instructions to the UE. In this example, a controlling node 300 is implemented in, or alternatively connected to, the macro node M from which an instruction "I" is sent to the UE, as described for action 208 above, thus instructing the UE to perform and report measurements on UE-specific downlink signals transmitted from the transmission points of the UE-specific measurement set.

First, the controlling node 300 identifies a set of conditions potentially affecting performance of the radio communication in the cluster cell as of action 200, and at least one type of reference signals and corresponding at least one radio measurement are selected by the controlling node 300 based on the identified set of conditions as of action 202. The controlling node 300 then obtains measurements made on the selected type(s) of reference signals according to the radio measurement(s) as of action 204, and configures the UE-specific measurement set of transmission points TP1-TP7 for the UE, out of the multiple transmission points M, TP1-TP11 serving the cluster cell, based on the obtained measurements, as of action 206.

In this figure, an area 304 indicates schematically the transmission points TP1-TP7 selected for inclusion in the UE-specific measurement set which transmit UE-specific downlink signals that the UE is instructed to measure, as illustrated by dashed arrows, and report to the node currently serving the UE. Another area 302 indicates schematically a smaller number of transmission points TP1-TP3 which are used for sending data to the UE, as illustrated by full arrows, and they are commonly referred to as the "COMP transmission points" according to LTE terminology. The remaining transmission points TP8-TP11 in the cluster cell are not included in the UE-specific measurement set since they are assumed to provide for less useful measurements.

Figure 4:
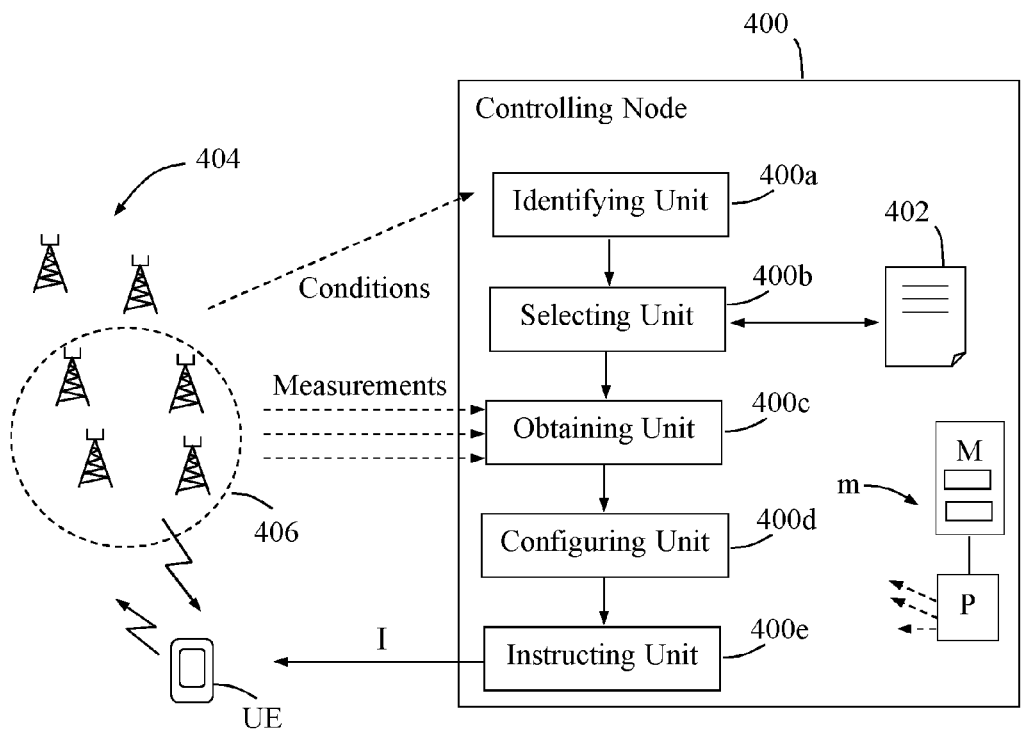
FIG. 4 is a block diagram illustrating a controlling node in more detail, according to further possible embodiments.

A detailed but non-limiting example of how a controlling node of a cellular network for wireless communication may be structured with some possible functional units to bring about the above-described operation of the controlling node, is illustrated by the block diagram in FIG. 4. In this figure, the controlling node 400 is configured to control measurements on signals to or from a UE engaged in a radio communication in a cluster cell of the cellular network, wherein the cluster cell is served by multiple transmission points 404. The controlling node 400 may be configured to operate according to any of the examples and embodiments described above and as follows. The controlling node 400 will now be described in terms of some possible examples of employing the solution.

The controlling node 400 comprises an identifying unit 400a configured to identify a set of conditions potentially affecting performance of the radio communication in the cluster cell, basically as described above for action 200. The controlling node 400 also comprises a selecting unit 400b configured to select at least one type of reference signals and corresponding at least one radio measurement based on the identified set of conditions, basically as described above for action 202. A preconfigured mapping table 402 which maps different possible conditions to different possible types of reference signals and corresponding radio measurements, may be used by the selecting unit 400b for selecting the at least one type of reference signals and the corresponding at least one radio measurement. The controlling node 400 further comprises an obtaining unit 400c configured to obtain measurements made on the selected at least one type of reference signals according to the at least one radio measurement, basically as described above for action 204.

The controlling node 400 also comprises a configuring unit 400d configured to configure a UE-specific measurement set of transmission points 406 for the UE, out of the multiple transmission points serving the cluster cell, based on the obtained measurements, basically as described above for action 206. The controlling node 400 finally comprises an instructing unit 400e configured to instruct the UE to perform and report measurements on UE-specific downlink signals transmitted from the transmission points of the UE-specific measurement set 406, basically as described above for action 208.

The above controlling node 400 and its functional units 400a-e may be configured or adapted to operate according to various optional embodiments. In a possible embodiment, the instructing unit 400e may be configured to instruct the UE to transmit uplink signals to be measured by the transmission points of the UE-specific measurement set based on the identified set of conditions. In another possible embodiment, the controlling node may be configured to instruct the transmission points of the UE-specific measurement set to perform and report measurements on the uplink signals when transmitted by the UE.

In another possible embodiment, the selecting unit 400b may be configured to select the at least one type of reference signals and the corresponding at least one radio measurement from a mapping table 402 which maps different possible conditions to different possible types of reference signals and corresponding radio measurements. In another possible embodiment, the controlling node 400 may be configured to update the set of conditions based on performance-related information relating to at least one of: performance of said at least one radio measurement, performance of the UE in the cluster cell, and system performance in the cluster cell.

In another possible embodiment, the controlling node 400 may be configured to use the identified set of conditions as a basis for deciding to employ a single shared cell identity for the cluster cell when at least one of said conditions fulfills a threshold qualification. In another possible embodiment, the selecting unit 400b may be configured to select transmission points providing the best measurement results in terms of signal strength and/or signal quality according to the obtained radio measurements on uplink and/or downlink radio signals, from the multiple transmission points serving the cluster cell for inclusion in the UE-specific measurement set.

In another possible embodiment, the controlling node 400 may be configured to be implemented in a macro node of the cluster cell or in a centralized node serving multiple cluster cells in the cellular network. In another possible embodiment, the controlling node 400 may be configured to request at least one radio node controlling one or more of the transmission points serving the cluster cell, to reduce transmission power at the one or more transmission points in order to reduce interference in the cluster cell.

It should be noted that FIG. 4 illustrates various functional units in the controlling node 400 and the skilled person is able to implement these functional units in practice using suitable software and hardware. Thus, the solution is generally not limited to the shown structures of the controlling node 400, and the functional units 400a-e may be configured to operate according to any of the features described in this disclosure, where appropriate.

The functional units 400a-e described above may be implemented in the controlling node 400 by means of program modules of a respective computer program comprising code means which, when run by a processor "P" causes the controlling node 400 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the controlling node 400 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the controlling node 400.

Figure 5:
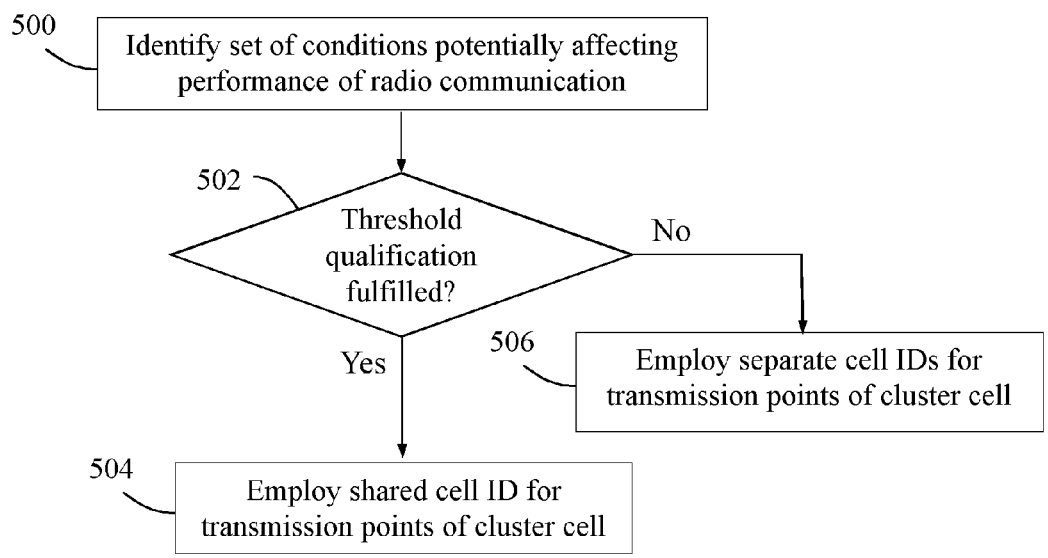
FIG. 5 is a flow chart illustrating an example of how the controlling node may operate, according to further possible embodiments

The flow chart of FIG. 5 illustrates how the above-described controlling node 300 or 400 may use at least one of the currently prevailing conditions, situation or circumstances as a basis for deciding whether to employ a shared cell identity or not for the cluster cell. In a first shown action 500, the controlling node identifies a set of conditions potentially affecting performance of the radio communication in the cluster cell, basically as described above for action 200.

The controlling node then compares at least one of the conditions in the identified set of conditions with a threshold qualification, in a following action 502. The threshold qualification has been predefined as a prerequisite for using shared cell identity for the cluster cell instead of using individual identities for different transmission points in the cluster cell. If the threshold qualification is satisfied, the controlling node decides to employ a single shared cell identity for the transmission points of the cluster cell, in an action 504. On the other hand, if the threshold qualification is not satisfied, the controlling node decides to employ multiple separate cell identities for the transmission points of the cluster cell, in an action 506.

Figure 6:
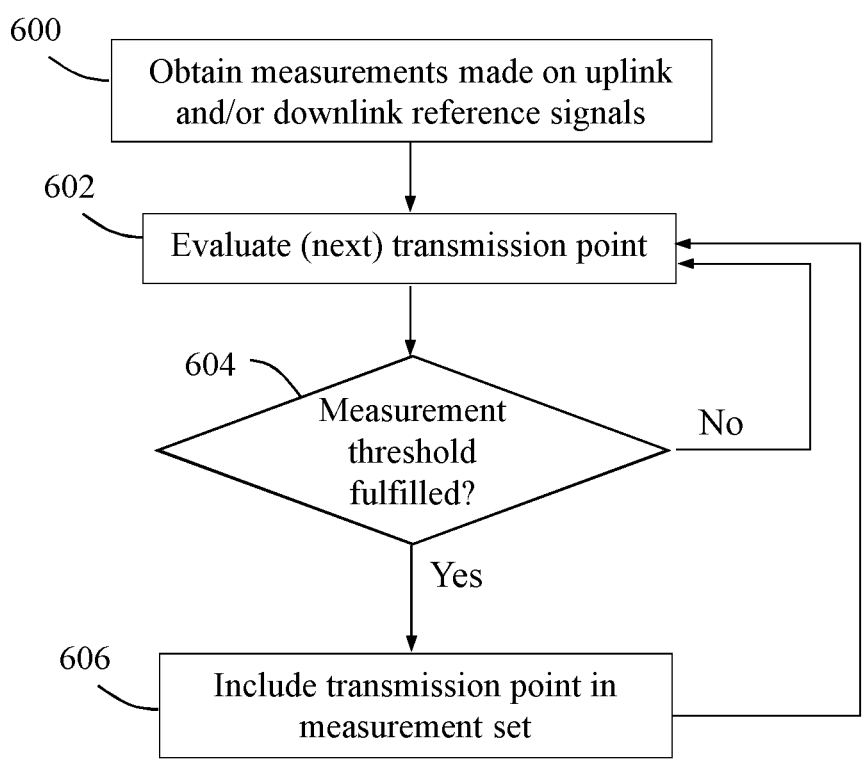
FIG. 6 is a flow chart illustrating another example of how the controlling node may operate, according to further possible embodiments.

The flow chart of FIG. 6 illustrates how the above-described controlling node 300 or 400 may evaluate at least some of the transmission points of the cluster cell, one by one, for deciding whether to include them in the UE-specific measurement set or not. This figure thus illustrates an example of how action 206 might be executed in more detail. In a first shown action 600, the controlling node obtains measurements made on at least one selected type of reference signals according to at least one selected radio measurement, basically as described above for action 204. The obtained measurements have been made on the at least one selected type of reference signals when communicated by each individual transmission point of the considered transmission points in the cluster cell, either as received from the transmission point and measured by the UE (uplink) or received from the UE and measured by the transmission point (downlink), or both.

The controlling node then selects one of the transmission points for evaluation, in a following action 602, and compares measurements of its communicated reference signals with a certain preset measurement threshold in another action 604. It is assumed that the measurement threshold has been set to separate "suitable" transmission points from "unsuitable" transmission points, with regard to inclusion in the UE-specific measurement set. The measurement threshold may refer to one or more parameters indicating signal strength or signal quality, or a combination of both.

If it is determined in action 604 that the measurements of the reference signals to or from the evaluated transmission point fulfills the measurement threshold, the controlling node selects the evaluated transmission point to be included in the UE-specific measurement set, in an action 606. If not, the evaluated transmission point is not included in the UE-specific measurement set and the process may return to action 602 for evaluating the next transmission point, if any. It should be noted that the measurement threshold may refer to a parameter that is high for suitable transmission points and low for unsuitable transmission points, such as signal strength. In that case, the evaluated transmission point is included in the UE-specific measurement set if the signal strength is above the threshold. On the other hand, the measurement threshold may alternatively refer to a parameter that is low for suitable transmission points and high for unsuitable transmission points, such as bit error rate which indicates signal quality. In that case, the evaluated transmission point is included in the UE-specific measurement set if the bit error rate is below the threshold.

It will now be described and explained how the above embodiments and examples may be used and implemented in practice.

As mentioned above, the identified set of conditions may be used as a basis for deciding to employ a single shared cell identity, cell-id, for the cluster cell, or "CoMP cluster", when at least one of the conditions in the set fulfill a threshold qualification. When employing a shared cell-id for multiple transmission points of a CoMP cluster serving a macro point coverage area, a tight synchronization between transmissions from the transmission points of the CoMP cluster may be realized. Furthermore since all the signals within a macro node coverage area are generated from the same cell, i.e. the cluster cell, orthogonality may be maintained even between different macro and pico layers. Using this approach, problems with severe interference from synchronization, CRS, broadcast and control channels may be avoided among the nodes or transmission points in the cluster cell. Hence, there is no need to rely on advanced interference cancellation schemes in the UE, which is an advantage since cancellation is not perfect anyway. It is better to avoid introducing interference in the first place than trying to mitigate it once it occurs. The interference cancellation in the UE requires a more complex receiver, which increases cost, processing and power consumption which reduces battery life.

In Release 10 of LTE for heterogeneous deployments of cluster cells, there have been standardized enhanced Inter-Cell Interference Coordination (eICIC) mechanisms for ensuring that the UE performs at least some measurements, e.g. Radio Resource Management (RRM), Radio Link Monitoring (RLM) and Channel State Information (CSI) measurements, in victim cells on signals in subframes which are aligned or overlap with low-interference subframes in aggressor cells. The victim cells and aggressor cells are typically served by low power nodes and high power nodes, respectively. These mechanisms involve configuring patterns of low-interference subframes at the transmitting aggressor network nodes and configuring measurement patterns for UEs. The measurement patterns are related to measurements to be done on victim cells e.g. on serving and neighboring pico nodes. In order to avoid collision, transmissions of certain signals and channels such as PSS/SSS, PBCH, PDSCH containing paging and SIBs, etc., can be shifted in time between aggressor and victim cells, basically their respective subframes or frames. However in TDD the same frame timing and Uplink/Downlink, UL/DL, subframe configuration should be used between the cells in order to avoid UE-to-UE and network node-to-network node interference. Therefore, heterogeneous deployments for TDD based on the Rel-10 eICIC approach seems particularly challenging considering that it is typically difficult to introduce a subframe offset between the macro and pico layers for avoiding sync-to-sync, PBCH-to-PBCH, SIBs-to-SIBs, etc., interference. Using the shared cell-id approach thus provides an efficient way of supporting heterogeneous deployments also for TDD networks.

In Rel-10 eICIC, the resource partitioning between macro and pico layers is commonly purely in the time-domain on a whole subframe basis. The partitioning can thus be considered rather coarse. A shared cell-id deployment on the other hand offers dynamic and fine granular resource partitioning both in time and frequency, basically allowing scheduling decisions to be taken on a Resource Block, RB, to RB basis at a subframe level rate. This optimizes the network operation by allowing resources to seamlessly and dynamically be allocated among the layers to adapt towards the instantaneous and relative traffic needs of macro/pico. Considering the often quick variations of the traffic characteristics such support for dynamical and seamless scheduling flexibility is an advantage.

Scheduling restrictions encountered in Rel-10 eICIC may be avoided. For example, there is a natural support for scheduling transmissions on the macro and pico layer at the same time, even for Rel-10 and earlier UEs. Scheduling restrictions due to control signaling for uplink retransmissions blocking subframes for some pico UEs may also be avoided.

Another benefit of the shared cell-id approach is that it decouples the operation of the uplink with that of the downlink. In the conventional Rel-10 eICIC techniques, the use of path-loss based cell selection in the uplink may lead to substantial problems for the downlink in that UEs are no longer necessarily served by the strongest transmission point. This is unfortunate since a heterogeneous deployment is sometimes primarily motivated by improving the uplink while the downlink performance provided by the macro point is already more than sufficient. Even if no handover bias is employed for achieving path-loss based cell selection, path-loss based selection of reception point in the uplink is still possible with the multi cell-id approach. However, that would imply that the same reception point has to handle receiving signals corresponding to different cells, which is more complicated and less efficient than if all the signals are fully compatible, as when they are associated with the same cell.

It was mentioned above that the above-described UE-specific downlink signals may comprise CSI reference signals, and the UE may in that case be instructed to perform and report measurements of the RSRP of the CSI reference signals or the RSRQ of the CSI reference signals, or both.

CSI-RS signals are UE-specific reference signals, used by UEs to acquire channel state information. However the teachings herein are applicable to any type of UE-specific reference signals and measurements performed on these signals, e.g. in a CoMP scenario with shared cell ID.

A cell can be configured with one, two, four, or eight different CSI-RS. The structure of the CSI-RS including the exact resource elements used for these reference signals depend on the number of CSI-RS configured in a cell and can be different in different cells. Within a resource block pair there are 40 possible positions for CSI-RS reference symbols. For example in case of two CSI-RS in a cell, the CSI-RS has two consecutive reference symbols per resource block pair. The two symbols are separated by Orthogonal Cover Codes (OCC) applied to the two reference symbols. This enables 20 different distinct CSI-RS configurations.

In the time domain, CSI-RS can be transmitted with different periods ranging from 5 ms to 80 ms. The subframe in which the CSI-RS is transmitted in a cell can also be configured, which allows separation of CSI-RSs between cells. In subframes in which the CSI-RS is transmitted, it is transmitted in every resource block in the frequency domain, which means that the transmission may cover the entire bandwidth used in the cell.

In normal operation, a cell transmits its PDSCH data on resource elements that may be used in another cell for CSI-RS transmission. However, to reduce the interference to CSI-RS, it is possible to configure one or several subsets of the resource elements that are interfering with CSI-RS in the target cell to mute, i.e. to use zero power on those resource elements. Besides reducing interference to CSI-RS in other cells, muting of PDSCH makes it possible for a terminal to receive CSI-RS from neighboring cells that can be used for CoMP.

A set of geographically separated transmission points directly and/or indirectly participating in data transmission to a UE is sometimes referred to as a "CoMP cooperating set", and the above-described UE-specific measurement set of transmission points may also be referred to as a "CoMP measurement set".

The CoMP cooperating set and the transmission points would normally be determined for each UE by the current serving node, e.g. a macro node, based on a suitable UE measurement. The serving node then informs the UE regarding the selected transmission points. In one example, the CSI measurement of points included in the CoMP measurement set are used by the serving transmission point or node. The serving node may obtain these CSI measurements based on UE measurement reports which may be sent via a suitable protocol e.g. MAC, L1/L2 control channel (PUCCH), PUSCH or even via RRC.

The management of the CoMP measurement set configured by the serving node may also be based on other types of UL measurements done by neighboring nodes on UE transmitted signals and/or DL measurements done by the UE on signals from neighboring nodes. Examples of UL measurements are those which are performed on Sounding Reference Signal (SRS), UL Demodulation Reference Signals (DMRS), PUCCH transmission in UL etc. Examples of DL measurements are DL RRM measurements, e.g. CRS based RSRP, RSRQ, path loss, etc., CSI-RS based measurements, e.g. CSI-RSRP, CSI-RSRQ, etc. The DL measurements are typically reported to the serving node by the UE. The UL measurements are performed by plurality of neighboring nodes and communicated to the serving node which can use them for selecting the transmission points in a CoMP cluster for a particular UE.

Frequency errors may occur in transmitting points, or radio nodes. The carrier frequency on which a base station (BS) or any transmission point (TP) transmits signals in a cell may incorporate frequency error due to Radio Frequency (RF) impairments. Frequency error is generally a measure of the difference between the actual BS or TP transmitted frequency and the assigned frequency. The same source is generally used for RF frequency and data clock generation.

The modulated carrier frequency of each E-UTRA carrier configured by the BS is within an accuracy range observed over a period of one subframe in LTE, which is 1 ms. The same requirements apply to Multi-Standard Radio (MSR) base station or TP supporting LTE. The relative frequency error between any two TPs is generally the sum of individual frequency error e.g. relative frequency error between two local area TPs will be ±0.2 ppm.

It will now be described how different measurements of signals may be performed. The above-mentioned RSRP and RSRQ are two existing measurements used for at least RRM e.g. for mobility in RRC connected state as well as in RRC idle state. The RSRP and RSRQ are also used for other purposes such as for enhanced cell ID positioning, Minimization of Drive Test (MDT), etc.

The measurements can be absolute or relative. An absolute measurement is performed on signals from one cell e.g. serving cell or neighboring cell. A relative measurement is the relative difference between the measurement performed on one cell and on another cell e.g. between serving cell measurement and neighboring cell measurement.

The RSRP measurement provides cell-specific signal strength metric at a UE. This measurement is used mainly to rank different LTE candidate cells according to their signal strength and is used as an input for handover and cell reselection decisions. RSRP is defined for a specific cell as the linear average over the power contributions of the Resource Elements (REs), which carry cell-specific RS within the considered measurement frequency bandwidth. In an alternative definition of RSRP, the power contributions from different resource elements can be replaced by the power of coherent averaging of REs over coherent bandwidth and/or coherent time of the channel.

Cell specific Reference Signals (CRS) are used for RSRP measurement. These reference symbols are inserted in the first and third last OFDM symbol of each slot, and with a frequency spacing of 6 subcarriers. Thus within a resource block of 12 subcarriers and 0.5 ms slot, there are 4 reference symbols.

The values of the symbols are based on pseudo-random sequences that are initialized with a cell-specific value. The period of CRS is 10 ms, and regardless of the cell bandwidth, the reference signal is defined assuming maximum possible LTE carrier bandwidth of 110 RBs. For cell bandwidths less than the maximum bandwidth of 110 RBs, only the reference symbols within the bandwidth are transmitted. A set of 84 different cell identities are defined in LTE, which in combination of 6 frequency shifts make a total number of 504 different reference signal sequences.

The RSRQ is a quality measure determined as the ratio of the RSRP and carrier RSSI. The latter part includes interference from all sources e.g. co-channel interference, adjacent carriers, out of band emissions, noise etc. The above-described measurements may be used by a serving node for configuring a CoMP measurement set in a CoMP scenario without shared cell-id. The CSI-RSRP and CSI-RSRQ are two possible measurements considered for configuring the CoMP measurement set in a CoMP scenario with shared cell ID. The CSI-RSRP and CSI-RSRQ are analogous to their RRM measurements counterparts: RSRP and RSRQ respectively. Thus, they are basically similar to the RRM measurements except that they are measured on CSI-RS instead of CRS.

As said above, CRS may be used for RSRP or RSRQ measurements. However in a shared cell ID scenario, a measurement based on CRS will only give some effective received power from all points. In this case RSRP or RSRQ may not be related to any link between a transmission point and a UE. Thus, the measurement must be based on some UE-specific reference signal, for instance CSI-RS. In other words, CSI-RSRP and/or CSI-RSRQ type measurements are needed by the serving node to configure the CoMP measurement set in the CoMP scenario with shared cell ID.

To enhance peak-rates within a technology, multi-carrier or carrier aggregation solutions are known. For example, it is possible to use multiple 5 MHz carriers to enhance the peak-rate within an HSPA network. Similarly in LTE for example, multiple 20 MHz carriers or even smaller carriers, e.g. 5 MHz, may be aggregated in the UL and/or on DL. Each carrier in a multi-carrier or carrier aggregation system is generally termed as a Component Carrier (CC) or is sometimes also referred to as a cell. In simple words, the component carrier means an individual carrier in a multi-carrier system. The term Carrier Aggregation (CA) may also be called "multi-carrier system", "multi-cell operation", "multi-carrier operation", "multi-carrier" transmission and/or reception. This means that the CA is used for transmission of signaling and data in the uplink and downlink directions.

One of the CCs is the Primary Component Carrier (PCC) or simply primary carrier or even anchor carrier. The remaining ones are called secondary component carrier (SCC) or simply secondary carriers or even supplementary carriers. Generally the primary or anchor CC carries the essential UE specific signaling. The primary CC exists in both uplink and downlink direction CA. The network may assign different primary carriers to different UEs operating in the same sector or cell.

Therefore, the UE has more than one serving cell in downlink and/or in the uplink: one primary serving cell and one or more secondary serving cells operating on the PCC and the SCC, respectively. The serving cell is interchangeably called Primary Cell (PCell) or Primary Serving Cell (PSC). Similarly, the secondary serving cell may be interchangeably called Secondary Cell (SCell) or Secondary Serving Cell (SSC). Regardless of the terminology, the PCell and SCell(s) enable the UE to receive and/or transmit data. More specifically the PCell and SCell exist in DL and UL for the reception and transmission of data by the UE. The remaining non-serving cells on the PCC and SCC are called neighbor cells.

The CCs belonging to the CA may belong to the same frequency band or to different frequency bands, or any combination thereof. The inter-band CA comprising carriers distributed over two bands is also called dual-band-dual-carrier-HSDPA (DB-DC-HSDPA) in HSPA or inter-band CA in LTE. Furthermore, the CCs in intra-band CA may be adjacent or non-adjacent in frequency domain. Using carrier aggregation between carriers of different Radio Access Technologies RATs, is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers.

The CCs in CA may or may not be co-located in the same site or base station or radio network node. For instance the CCs may originate at different locations, e.g. from non-located BS or from BS and RRH or RRU. Some well-known examples of combined CA and multi-point communication are DAS, RRH, RRU, CoMP, multi-point transmission/reception etc. The teachings herein also apply to multi-point carrier aggregation systems.

In action 200 above, it was described that the controlling node identifies a set of conditions potentially affecting performance of the radio communication in the cluster cell. Then some examples of static and dynamic conditions were briefly outlined which will now be described and explained in more detail. The static, including semi-static, conditions basically change on slow time basis, typically between a minute to several days. The dynamic, or real-time, conditions are related to radio conditions such as interference level, traffic load, etc., and may therefore change much faster and more frequently, typically within a few milliseconds.

The above-mentioned examples of static conditions are explained in more detail as follows.
1. The configuration of reference signals at the transmission points serving the cluster cell may comprise CSI-RS configuration in TPs involved in a CoMP cluster, e.g. any of:
   System bandwidth supported by each TP.
   Bandwidth of CSI-RS in each TP e.g. 6 RBs or 25 RBs, etc.
   Periodicity of CSI-RS in each TP e.g. whether they are transmitting every 5 ms, every 10 ms etc.
   CSI-RS density e.g. number of CSI-RS per resource block.
   Antenna port configuration e.g. number of antennas ports on which CSI-RS are transmitted.
2. The time synchronization between transmissions from the transmission points serving the cluster cell may comprise any of:
   Intra-CoMP cluster synchronization level i.e. level of synchronization between signals transmitted by the TPs in the same CoMP cluster.
   Inter-CoMP cluster synchronization level i.e. level of synchronization between signals transmitted by the TPs belonging to different CoMP clusters.
   Intra-CoMP cluster observed or received time difference at a UE i.e. between signals received from TPs in the same cluster.
   Inter-CoMP cluster observed or received time difference at a UE i.e. between signals received from TPs belonging to different CoMP clusters.
3. The frequency synchronization between transmissions from the transmission points serving the cluster cell may comprise any of:
   Intra-CoMP cluster frequency synchronization level i.e. frequency error between frequencies of signals transmitted by the TPs in the same CoMP cluster.
   Inter-CoMP cluster frequency synchronization level i.e. frequency error between frequencies of signals transmitted by the TPs belonging to different CoMP clusters.
4. The characteristics of communication interfaces between the transmission points serving the cluster cell may comprise any of:
   Type of interface or backhaul, e.g. X2 interface, fiber link or wireless link.
   Reliability level of interface e.g. in terms of error rate, packet loss rate, etc., e.g. fiber is considered robust and wireless link is considered less robust.
   Transmission capability of interface, which may include bit rate or rate at which information between TPs can be exchanged, and time delay involved in exchanging information between TPs.
5. The characteristics of deployment or network topology of the cluster cell may comprise any of:
   Cluster dimension. For example it can be expressed in terms of one or more of the following: inter-site distance between TPs in a cluster, inter-site distance between neighboring clusters e.g. between serving nodes of different clusters, and cluster size which may be expressed in terms of cluster radius or cluster range i.e. radius of a cluster from the serving radio node of the cluster.
   Isolation level of a cluster with respect to neighboring clusters e.g. if a cluster is partly shielded due to being located in indoor or local area. The isolation level can be expressed as path loss of signal received from a neighboring cluster at a point in the cluster, e.g. in the cluster center or at a specific TP.
   Imbalance between downlink and uplink radio links in a TP e.g. in UL-DL path loss difference measured for the same UE.
   Receiver type of the TP. This may implicitly indicate the performance of uplink measurement on SRS signal sent by the UE.
6. The radio propagation environment may comprise any of:
   Level of signal dispersion such as delay spread or multi-path power delay profile observed at the radio receiver of the UE and/or TPs, etc.
   Doppler speed of the UE.
   Dense urban, urban, rural environments characterized by e.g. level of signal dispersion at the radio receiver, number of dominant multipaths of signals at the radio receiver.
7. The muting scheme of downlink transmissions from the transmission points serving the cluster cell may comprise any of:
   Intra-cluster muting i.e. indication that the muting, e.g. muting PDSCH resource element in TP1 overlapping with CSI-RS in TP2, is applied to avoid interference to the CSI-RS transmitted by the TPs within the same cluster.

Inter-cluster muting i.e. indication that the muting is applied to avoid interference to the CSI-RS transmitted by TPs belonging to different clusters.

Hybrid-cluster muting e.g. indication that the muting is applied to avoid interference to the CSI-RS transmitted by TPs belonging to the same and also to the selected set of TPs belonging to different clusters, Example of selected TPs are those at the border of the cluster or TPs in another cluster but causing strong interference.

Regarding static condition 1 above, the controlling node may obtain the CSI-RS configuration from one or more of the following:

From an individual TP about its configuration.

From the serving node or TP controlling TPs in a CoMP cluster about configuration of all TPs or group of TPs in that cluster.

From another node that configures CSI-RS or which has information about CSI-RS configuration in different TPs. Examples of such nodes are e.g. O&M, SON etc.

Regarding static condition 2 above, transmit time synchronization may refer to the time synchronization between the signals transmitted by the TPs also called the time alignment between signals transmitted by any two pair of TPs. It is also known as the cell phase synchronization accuracy. It is defined as the maximum absolute deviation in frame start timing between any pair of TPs or cells on the same frequency that have overlapping coverage areas. In a shared cell ID CoMP scenario, the synchronization accuracy between any two TPs within the same cluster may be very tight e.g. less than 100 ns. This is because typically there is fiber or high speed link between the TPs in the same CoMP cluster. However the synchronization accuracy between any two TPs belonging to different CoMP clusters may be in the order of 1-10 µs. The network node, e.g. the controlling node, may determine the synchronization levels or synchronization accuracies between TPs within the cluster and between clusters by one or several means e.g. based on:

Pre-determined information related to the synchronization between TPs.

Receiving information from another node e.g. centralized node containing the synchronization information about the TPs.

Receiving timing information, e.g. frame timing, from TPs via backhaul and using the received information to determine the time alignment between different TPs.

Further, a received time synchronization may be the observed time difference of the signals from the two TPs received at a UE. This is also known as the received time difference of signals received from the TPs at the UE. The received time difference at the UE depends upon several factors namely: the UE location with respect to the TPs in the cluster, the inter-site distance between TPs, size of cluster, time alignment or phase synchronization accuracy between TPs etc. The magnitude of the received time difference can be as large as 10-30 µs. The received time difference implies that CoMP with shared cell-ID might not be efficient for TPs that are too far from each other and/or too far from the UE they are serving. Too far TPs mean that the observed time difference at a UE close to one of the points might be too large for efficient coordination. For example if the time difference plus the maximum delay spread of the channel is larger than the cyclic prefix of e.g. 4.7 µs, then there will be interference between the signals from the two TPs.

The network node, e.g. the controlling node, may determine the observed time difference by one or more of the following means e.g. based on:

Statistics or historical data related to the observe time difference measurement performed by the UE from the given set of TPs. These measurements can be stored in the determining network node or can be obtained from a centralized node that maintains such a data base of results.

Implicit determination using mapping principle, which maps a known parameter related to the UE (e.g. UE measurement(s) or UE position) to the observed time difference between the TPs—e.g.

Mapping the UE relative signal measurement between the two TPs to the observed time difference between the TPs by using pre-determined mapping or lookup table. Examples of relative measurements are relative RSRP, relative CSI-RSRP etc.

Mapping to the UE location and the observed time difference by using pre-determined mapping or lookup table. The UE location can be determined by using any existing positioning method referred to as e.g. E-CID, OTDOA, UTDOA, etc.

The network node, e.g. the controlling node may also be referred to as the "determining node". Regarding static condition 3 above, the frequency synchronization may be expressed in terms of relative frequency error or relative frequency accuracy between any two TPs. Similar to transmit time synchronization, the information related to the frequency synchronization between TPs may be obtained by the determining node based on the pre-determined information, statistics, historical data or information received from another node.

Regarding static conditions 4 and 5 above, the information related to the communication interfaces between TPs and/or deployment or network topology related to CoMP clusters, respectively, may be obtained e.g. based on:

Pre-determined information stored in the determining node. The information does not change frequently. It can therefore be updated "in the background".

Implicitly by the determining node by observing or measuring the data rate and/or delay of data transmission over the network interfaces. The links between the TPs, e.g. X2 interface or wireless backhaul, must be fast enough to provide good coordination between them. Therefore for example, if the data rate on the interface between certain TPs is observed to be above a threshold then the determining network node may assume that the link is of fiber.

Regarding static condition 6 above, information related to the radio propagation environment in which the TPs are located may be determined based on one or more of the following:

Pre-determined information related to the radio environment which information is mapping a TP and a radio environment. This information may be stored in the determining node or may be obtained from a centralized node that maintains such information in a data base.

Determination based on real time radio measurements performed by the UE, e.g. RSRP, RSRQ, CSI-RSRP, CSI-RSRQ, and/or by the TPs, e.g. received signal power, received interference power. That is, the determining node, e.g. the controlling node, receives the radio measurements and may determine the radio environment by mapping one or more of the measurements to the radio environment characteristics, e.g. delay spread, etc.

Statistics or historical data related to the radio measurements performed by the UE from the given set of TPs and/or performed by the TPs. These measurements may be stored in the determining node or may be obtained from a centralized node that maintains such information in a data base with radio measurement results. The obtained statistics may be mapped to the radio environment by using pre-defined mapping or lookup table.

Regarding static condition 7 above, muting information of the muting scheme used in each cell cluster may be obtained from each TP about its own muting scheme or from the serving node about all TPs of each cluster cell. A centralized node, e.g. an O&M, OSS, or SON node, which comprises the information related to the muting scheme, may also provide the information about the muting to the controlling node determining the conditions.

The above-mentioned examples of dynamic conditions may be obtained by the controlling node by requesting the information from each TP or from a master TP of the cluster cell, e.g. a macro node. The requested node then sends the desired information to the controlling node. If the controlling node is an eNB then the information may be exchanged between the eNBs e.g. over an X2 interface.

It was mentioned above that the at least one type of reference signals and the corresponding at least one radio measurement may be selected from a mapping table which maps different possible conditions to different possible types of reference signals and corresponding radio measurements. It will now be described in more detail how the identified conditions of action 200 may be mapped to reference signals to accomplish action 202 above.

At least some of the embodiments herein refer to using one or more identified conditions to select the most suitable type(s) of reference signals and corresponding radio measurements for configuring the CoMP measurement set. The radio measurements may be performed by the UE or by the TP depending upon the type of reference signal selected. The configuring of the CoMP measurement set means that the controlling node uses these radio measurements to select N most suitable TPs in a cluster for reporting Channel State Information (CSI). The UE may then be instructed and configured to report CSI, e.g. CQI, Precoding Matrix Indicator (PMI), rank indicator (RI) etc., from these TPs. The CSI reports may then be used by the serving node for scheduling, link adaptation, selection of antenna transmission mode, etc.

The operation of mapping the conditions to the reference signals and measurements may be implemented in the controlling node or it may be implemented in another node e.g. a node of the cluster cell serving the UE or in another centralized node e.g. O&M, SON etc.

A mapping or lookup table, which maps the determined conditions to the most suitable set of reference signals and radio measurements using the selected reference signals, may be pre-determined and maintained in the controlling node or other node. The mapping table may be updated when conditions are changed or new conditions are identified.

The reference signals and the corresponding radio measurements, which are deemed to be most suitable according to the identified conditions, may thus be selected for configuring the CoMP measurement set of transmission points. Here, the term "most suitable" means that the system performance in the CoMP scenario can be enhanced, e.g. user bit rate, system throughput, SINR are above thresholds or the like. This is explained with an example. Consider for example that in CoMP scenario with shared cell ID:
- muting cannot provide adequate quality of CSI-RS measurement,
- clusters are not isolated enough, i.e., muting within own cluster does not provide adequate quality of CSI-RS measurement, and/or
- coordination between transmission points is not possible.

Then CSI-RS and corresponding CSI-RSRP or CSI-RSRQ measurements are not considered to be suitable to configure a CoMP measurement set. In this situation other signals such as SRS may be used for the measurement. In this case the serving node will configure the UE to transmit the SRS over certain time period and configure a plurality of TPs to perform UL measurement(s) on the SRS and report the results. However since SRS is sent in uplink the measurement based on SRS is performed by the receiver of the TP and therefore can only provide information on uplink channel. Example of such measurement is uplink signal strength, uplink signal quality, etc. Certain reciprocity condition is required to extract DL situation from the UL channel. The measurement is based on long term path loss, e.g. 200-1000 ms. This means that if UL-DL path loss imbalance is small, then SRS based measurements are suitable for selecting CoMP measurement set. For example, a TP may be selected if the SRS based signal is above a threshold; however up to N strongest TPs may be selected for CoMP measurement set.

In another example, UL reference signals, e.g. SRS, and DL reference signals, e.g. CSI-RS, may be used for both UL and DL radio measurements related to each TP depending upon the conditions applicable to a CoMP cluster. In this case, UL and DL radio measurements are compared with their respective thresholds to select the CoMP measurement set, e.g. M number of TPs. The combined measurement based on downlink UE-specific signal CSI-RS and uplink measurement based on uplink UE-specific signal leads to more accurate selection criteria. The UL and DL measurements can also be combined using a suitable function and the combined measurement can be compared to a certain threshold to select the CoMP measurement set. Some examples of such a function are average, sum, weighted average, etc.

When a UE is close to a macro or pico node, the effective channel used for radio communication is heavily dominated by the channel from that nearby node and the CSI feedback is essentially targeting the properties of that channel of the nearby node. In this case, it is possible to use UE specific CSI-RS and cluster specific CRS. The CRS experiences low interference and can provide information about the strongest point. Therefore two types of DL measurements: one based on CSI-RS and another one based on CRS (e.g. RSRP) can be used by comparing them with suitable thresholds to select the CoMP measurement set.

If none of the determined conditions are found to be feasible for using CoMP based on shared cell ID, then the controlling node, e.g. SON, O&M, OSS, network planning node, etc., may also reconfigure the TPs to operate using different cell IDs e.g. each TP in a cluster may have its own CRS. However if the conditions are changed or are enhanced, then the shared cell ID may be reconfigured, i.e. the cell cluster may be reconfigured with a shared cell ID again.

It was described above that at least one type of reference signals and at least one radio measurement may be selected from a preconfigured mapping table based on a set of determined conditions. The mapping table thus maps different possible conditions to different possible types of uplink and downlink reference signals and corresponding radio measurements. An illustrative but non-limiting example of how such a mapping table may be configured is shown in the table below comprising different mappings 1-11.

| No | Conditions | Type of reference signals | Radio measurements |
|----|------------|---------------------------|---------------------|
| 1 | Time and frequency synchronization accuracy better than certain threshold<br>Intra-cluster and inter-cluster muting are applied | CSI-RS | CSI-RSRP and/or CSI.RSRQ |
| 2 | Time and frequency synchronization accuracy worse than certain threshold<br>Only Intra-cluster muting is applied | SRS | SRS based measurements e.g. UL SRS signal strength |
| 3 | Time and frequency synchronization accuracy better than certain threshold<br>Only Intra-cluster muting is applied<br>Deployment scenario; clusters are isolated or inter-site distance between clusters is above threshold<br>Imbalance between UL and DL radio link is below threshold e.g. | CSI-RS, SRS | CSI-RS based measurements and also SRS based uplink measurements |
| 4 | Time and frequency synchronization accuracy worse than certain threshold<br>Only Intra-cluster muting is applied<br>Very low cell (traffic) load<br>Low traffic | CSI-RS | CSI-RSRP and/or CSI.RSRQ can still be used due to low load |
| 5 | Time and frequency synchronization accuracy better than certain threshold<br>Intra-cluster muting is applied<br>Distance between TPs is larger than a certain threshold | SRS | SRS based measurements e.g. UL SRS signal strength |
| 6 | Time and frequency synchronization accuracy better than certain threshold<br>Inter-cluster muting is applied<br>The interference between CSI-RS resources from different TPs is larger than a certain threshold | SRS | SRS based measurements e.g. UL SRS signal strength |
| 7 | Time and frequency synchronization accuracy better than certain threshold<br>Intra-cluster and/or inter-cluster muting are applied<br>System bandwidth above a certain value | CSI-RS | CSI-RSRP and/or CSI.RSRQ |
| 8 | Time and frequency synchronization accuracy better than certain threshold<br>UL bandwidth granted to a UE is smaller than a certain threshold | CSI-RS | CSI-RSRP and/or CSI.RSRQ |
| 9 | Time and frequency synchronization accuracy better than certain threshold<br>Intra-cluster and/or inter-cluster muting are applied<br>Periodicity of CSI-RS is larger than a certain value | CSI-RS | CSI-RSRP and/or CSI.RSRQ |
| 10 | Time and frequency synchronization accuracy better than certain threshold<br>Intra-cluster and/or inter-cluster muting are applied<br>CSI-RS density is larger than a certain value | CSI-RS | CSI-RSRP and/or CSI.RSRQ |
| 11 | Time and frequency synchronization accuracy better than certain threshold<br>Number of TPs in the cluster larger than a certain value.<br>Intra-cluster or inter-cluster muting are applied | SRS | SRS based measurements e.g. UL SRS signal strength |

It will now be discussed how the identified conditions may be enhanced to enable use of suitable radio measurements for the CoMP measurement set. The management of the CoMP measurement set may be further improved if the conditions required to effectively use the most suitable measurements, e.g. CSI-RS based measurements, for the CoMP measurement set configuration are enhanced. This may be achieved either by making one or more conditions more favorable i.e. either one or more semi-static conditions, one or more dynamic conditions or combination thereof. It may thus be possible to improve the selection of transmission points for the CoMP measurement set, which in turn could lead to better performance of CoMP e.g. higher user and/or system throughput, lower interference, etc.

The method of enhancing or changing the conditions may be triggered based on one or more CoMP performance criteria. Some examples of such CoMP performance criteria are:
  Observed performance of the CoMP measurement results, and/or
  User performance, and/or
  System performance in the CoMP scenario.

The user or system performance may be expressed in terms of bit rate, throughput, etc. The system performance may be determined by considering the throughput of all TPs in a cell cluster, selected TPs in a cell cluster, specific TPs based on their location such as those in the border of the cell cluster, etc.
  Some examples of CoMP measurement results are:
  Radio measurements used for configuring CoMP measurement set. They can be performed by the UE and/or by the TPs, e.g. CSI-RSRP, CSI-RSRQ, RSRP/RSRQ, SRS based signal measurements etc., and/or
  CSI measurements performed by the UE over signals sent by one or more TPs in a CoMP cluster e.g. CQI, PMI, RI, etc.

The above may be implemented in a suitable network node. Examples of such network nodes are: node that determines the conditions, serving or master node of the CoMP cluster etc. Such a node can be termed as 'condition enhancing node' which as stated above can also be the same as the 'condition determining node'.

For example, if the "condition enhancing" node, which may be the above controlling node, observes that the measurements results related to one or more CoMP measurements are below their respective threshold and/or user bit rate is below a threshold and/or system performance is below a threshold, then one or more condition may be enhanced. In one example, a serving node of a neighboring CoMP cluster may be requested by the condition enhancing node to reduce the interference e.g. by muting resources which overlap with reference signals in the TP of the affected or victim cluster. In response, the resources used, e.g. transmitting PDSCH, may be muted in the aggressor TPs as controlled by the serving node of the cluster containing those TPs. The condition enhancing node may also provide location information, e.g. geographical coordinates, of the victim TPs suffering from interference caused by aggressor TPs. The serving node of the aggressor cell cluster may therefore use positioning information of the victim TPs and also of the aggressor TPs and may use them to ensure that only TPs that are close to the victim cluster are muted. The muting may be applied fully, i.e. no transmission is made in certain resources, or partially, i.e. transmission with lower power and/or reduced activity, in the aggressor TPs. The reduction in interference to the victim TPs will enhance the user and system performance.

In yet another example, if it is observed by the condition enhancing node that CSI-RSRP and/or CSI-RSRQ and/or CSI measurement accuracy is degraded in a cluster cell, then this node may request the serving node of that cluster cell to upgrade one or more CSI-RS configuration parameters. For example, the requested serving node of the cluster cell may reduce the periodicity of the CSI-RS e.g. from 10 ms to 5 ms. This in turn will enable the UE to sample the CSI-RS resource elements more frequently which may thus in turn improve the measurement accuracy of the measurements using CSI-RS.

In the same way, the static or semi-static conditions may also be enhanced by the condition enhancing node if it is observed that the performance is degraded due to such conditions. For example, the data transmission rate over an X2 interface may be increased to improve the coordination between CoMP clusters. However, any enhancements of the static or semi-static conditions will be done by the condition enhancing node on slow time basis compared to the enhancement of dynamic conditions.

The teachings herein are also applicable to multi-carrier or carrier aggregation when used in combination with CoMP. For example, in multi-carrier or carrier aggregation when used with CoMP scenario, at least some of the embodiments may be applied on each carrier frequency. In another example, the embodiments may be applied on a selected set of carriers, on specific carriers, e.g. a primary component carrier, a carrier with bandwidth smaller than a threshold such as 5 MHz or less, on carriers belonging to specific frequency band or frequency range, e.g. those which are above 1 GHz, etc.

CoMP with shared cell-ID has several advantages over CoMP with different cell-ID. Avoiding many instances of handover, and decoupling of uplink and downlink operations are two exemplary benefits of CoMP with shared cell-ID. However the CoMP with shared cell-ID scenario requires certain conditions to operate efficiently and the teachings herein provide embodiments enabling the cellular network to identify the circumstances necessary for using CoMP with shared cell-ID, and for operating efficiently and reliably in such scenarios.

For example, the embodiments herein advantageously determines which measurements are used for determining CoMP measurement sets for the wireless communication devices operating within a CoMP cluster. Such determining may be done on a UE-specific basis, and it allows the network to decide the CoMP measurement set using, e.g., different types of reference signals at different times, in dependence on evaluating operating parameters bearing on the sufficiency of certain reference signal measurements. In an example, the teachings herein provide embodiments for identifying what reference signals should be used to configure a CoMP measurement set at any given time, for any given UE.

Further, some embodiments may improve such measurements by exchanging information between CoMP clusters, to reduce interference in resources that are used for such measurements. Still further, it is also taught herein to observe or otherwise monitor or track one or more performance metrics related to determining which measurements to use for deciding the CoMP measurement sets, and to possibly update mappings in the above-described mapping table used for determining which measurements to use under which operating conditions, so that the network optimizes or otherwise improves its measurement selection process over time.

While the solution has been described with reference to specific exemplary embodiments, the description is generally only intended to illustrate the inventive concept and should not be taken as limiting the scope of the solution. For example, the terms "controlling node", "transmission point", "cluster cell", "conditions" and "UE-specific measurement set" have been used throughout this description, although any other corresponding entities, functions, and/or parameters could also be used having the features and characteristics described here. The solution is defined by the appended claims.

The invention claimed is:
1. A method performed by a controlling node of a cellular network for wireless communication, to control measurements on signals to or from a User Equipment, UE, engaged in a radio communication in a cluster cell of the cellular network, wherein the cluster cell is served by multiple transmission points, the method comprising:
  identifying a set of conditions potentially affecting performance of the radio communication in the cluster cell;
  selecting at least one type of reference signals and a corresponding at least one type of radio measurement to be made on the selected at least one type of reference signals, based on the identified set of conditions, wherein the at least one type of reference signals and the corresponding at least one type of radio measurement are selected from a mapping table which maps different possible conditions to different possible types of reference signals and corresponding radio measurements;
  obtaining measurements made on the selected at least one type of reference signals according to the selected at least one type of radio measurement;
  configuring a UE-specific measurement set of transmission points for the UE, out of the multiple transmission points serving the cluster cell, based on the obtained measurements; and
  instructing the UE to perform and report measurements on UE-specific downlink signals transmitted from the transmission points of the UE-specific measurement set.

2. The method according to claim 1, wherein the UE is further instructed to transmit uplink signals to be measured by the transmission points of the UE-specific measurement set based on the identified set of conditions.

3. The method according to claim 2, wherein the transmission points of the UE-specific measurement set are instructed to perform and report measurements on the uplink signals transmitted by the UE.

4. The method according to claim 1, wherein the set of conditions comprises static conditions including any of:
  configuration of reference signals at the transmission points serving the cluster cell;
  time synchronization between transmissions from the transmission points serving the cluster cell;
  frequency synchronization between transmissions from the transmission points serving the cluster cell;
  characteristics of communication interfaces between the transmission points serving the cluster cell;
  characteristics of deployment or network topology of the cluster cell;
  radio propagation environment; and
  muting scheme of downlink transmissions from the transmission points serving the cluster cell.

5. The method according to claim 1, wherein the set of conditions comprises dynamic conditions including any of:
  interference experienced at the UE and/or at the transmission points serving the cluster cell;
  current traffic load in the cluster cell;
  amount of pending data in buffers of the transmission points serving the cluster cell;
  current utilization of uplink and downlink channels for transmissions;
  currently used bandwidth for uplink and downlink transmissions; and
  current quality of signals received at the UE and/or at the transmission points serving the cluster cell.

6. The method according to claim 1, wherein the selected at least one type of reference signals comprise at least one of: uplink reference signals sent from the UE and downlink reference signals sent from the transmission points serving the cluster cell.

7. The method according to claim 1, wherein said set of conditions is updated based on performance-related information relating to at least one of: performance of said at least one type of radio measurement, performance of the UE in the cluster cell, and system performance in the cluster cell.

8. The method according to claim 1, wherein the identified set of conditions is used as a basis for deciding to employ a single shared cell identity for the cluster cell when at least one of said conditions fulfils a threshold qualification.

9. The method according to claim 1, wherein transmission points providing the best measurement results in terms of signal strength and/or signal quality according to the obtained radio measurements on uplink and/or downlink radio signals, are selected from the multiple transmission points serving the cluster cell for inclusion in the UE-specific measurement set.

10. The method according to claim 1, wherein the controlling node is implemented in a macro node of the cluster cell or in a centralized node serving multiple cluster cells in the cellular network.

11. The method according to claim 1, wherein at least one type of radio node controlling one or more of the transmission points serving the cluster cell, is requested to reduce transmission power at the one or more transmission points in order to reduce interference in the cluster cell.

12. The method according to claim 1, wherein the UE-specific downlink signals comprise Channel State Information Reference Signals, CSI-RS, and the UE is instructed to perform and report measurements of at least one of: Reference Signal Received Power, RSRP, of the CSI-RS and Reference Signal Received Quality, RSRQ, of the CSI-RS.

13. A controlling node of a cellular network for wireless communication, the controlling node being configured to control measurements on signals to or from a User Equipment, UE, engaged in a radio communication in a cluster cell of the cellular network, wherein the cluster cell is served by multiple transmission points, the controlling node comprising:
  a memory configured to store a mapping table that maps different possible conditions to different type of reference signals and corresponding radio measurements; and
  a processing circuit operatively coupled to the memory and configured to:
    identify a set of conditions potentially affecting performance of the radio communication in the cluster cell;
    select, from the mapping table, at least one type of reference signals and a corresponding at least one type of radio measurement to be made on the selected at least one type of reference signals based on the identified set of conditions;
    obtain measurements made on the selected at least one type of reference signals according to the selected at least one type of radio measurement;
    configure a UE-specific measurement set of transmission points for the UE, out of the multiple transmission points serving the cluster cell, based on the obtained measurements; and
    instruct the UE to perform and report measurements on UE-specific downlink signals transmitted from the transmission points of the UE-specific measurement set.

14. The controlling node according to claim 13, wherein the processing circuit is configured to instruct the UE to transmit uplink signals to be measured by the transmission points of the UE-specific measurement set based on the identified set of conditions.

15. The controlling node according to claim 14, wherein the processing circuit is configured to instruct the transmission points of the UE-specific measurement set to perform and report measurements on the uplink signals transmitted by the UE.

16. The controlling node according to claim 13, wherein the set of conditions comprises static conditions including any of:
configuration of reference signals at the transmission points serving the cluster cell;
time synchronization between transmissions from the transmission points serving the cluster cell;
frequency synchronization between transmissions from the transmission points serving the cluster cell;
characteristics of communication interfaces between the transmission points serving the cluster cell;
characteristics of deployment or network topology of the cluster cell;
radio propagation environment; and
muting scheme of downlink transmissions from the transmission points serving the cluster cell.

17. The controlling node according to claim 13, wherein the set of conditions comprises dynamic conditions including any of:
interference experienced at the UE and/or at the transmission points serving the cluster cell;
current traffic load in the cluster cell;
amount of pending data in buffers of the transmission points serving the cluster cell;
current utilization of uplink and downlink channels for transmissions;
currently used bandwidth for uplink and downlink transmissions; and
current quality of signals received at the UE and/or at the transmission points serving the cluster cell.

18. The controlling node according to claim 13, wherein the selected at least one type of reference signals comprise at least one of: uplink reference signals sent from the UE and downlink reference signals sent from the transmission points serving the cluster cell.

19. The controlling node according to claim 13, wherein the processing circuit is configured to update said set of conditions based on performance-related information relating to at least one of: performance of said at least one type of radio measurement, performance of the UE in the cluster cell, and system performance in the cluster cell.

20. The controlling node according to claim 13, wherein the processing circuit is configured to use the identified set of conditions as a basis for deciding to employ a single shared cell identity for the cluster cell when at least one of said conditions fulfils a threshold qualification.

21. The controlling node according to claim 13, wherein the processing circuit is configured to select transmission points providing the best measurement results in terms of signal strength and/or signal quality according to the obtained radio measurements on uplink and/or downlink radio signals, from the multiple transmission points serving the cluster cell for inclusion in the UE-specific measurement set.

22. The controlling node according to claim 13, wherein the controlling node comprises a macro node of the cluster cell or a centralized node serving multiple cluster cells in the cellular network.

23. The controlling node according to claim 13, wherein the processing circuit is configured to request at least one type of radio node controlling one or more of the transmission points serving the cluster cell, to reduce transmission power at the one or more transmission points in order to reduce interference in the cluster cell.

24. The controlling node according to claim 13, wherein the UE-specific downlink signals comprise Channel State Information Reference Signals, CSI-RS, and the UE is instructed to perform and report measurements of at least one of: Reference Signal Received Power, RSRP, of the CSI-RS and Reference Signal Received Quality, RSRQ, of the CSI-RS.

* * * * *